(12) United States Patent  
Becker

(10) Patent No.: US 7,021,081 B2
(45) Date of Patent: Apr. 4, 2006

(54) DRY ICE BLOCK EXTRUDER

(75) Inventor: James R. Becker, Boerne, TX (US)

(73) Assignee: Airgas Dry Ice, San Antonio, TX (US)

( * ) Notice: Subject to any disclaimer, the term of this patent is extended or adjusted under 35 U.S.C. 154(b) by 0 days.

(21) Appl. No.: 10/699,713

(22) Filed: Nov. 3, 2003

(65) Prior Publication Data
US 2005/0092017 A1   May 5, 2005

(51) Int. Cl.
F25J 1/00     (2006.01)
F25C 5/14     (2006.01)

(52) U.S. Cl. .............................. 62/605; 62/604; 62/341
(58) Field of Classification Search ................ 62/604, 62/605, 341
See application file for complete search history.

(56) References Cited

U.S. PATENT DOCUMENTS

| 1,989,873 | A | * | 2/1935 | Marcus et al. ................ 62/604 |
| 3,163,022 | A | | 12/1964 | Hottenroth |
| 3,576,112 | A | | 4/1971 | Frost et al. |
| 3,660,986 | A | | 5/1972 | Hardt et al. |
| 3,670,516 | A | | 6/1972 | Duron et al. |
| 3,786,645 | A | | 1/1974 | Cann |
| 3,835,657 | A | | 9/1974 | Scudder |
| 4,412,852 | A | * | 11/1983 | Umino et al. ................ 62/604 |
| 4,770,684 | A | | 9/1988 | Tsukada et al. |
| 4,780,119 | A | | 10/1988 | Brooke |
| 5,189,939 | A | | 3/1993 | Allen |
| 5,222,363 | A | | 6/1993 | Allen, Jr. et al. |
| 5,301,509 | A | | 4/1994 | Lloyd et al. |
| 5,343,715 | A | | 9/1994 | Lang |
| 5,385,023 | A | | 1/1995 | Montemayor et al. |
| 5,419,138 | A | * | 5/1995 | Anderson et al. ............. 62/605 |
| 5,426,948 | A | * | 6/1995 | Hyde, Jr. ..................... 62/604 |
| 5,473,903 | A | | 12/1995 | Lloyd et al. |
| 5,475,981 | A | | 12/1995 | Becker |
| 5,787,716 | A | | 8/1998 | Allen, Jr. |
| 5,845,516 | A | | 12/1998 | Allen, Jr. |
| 6,189,336 | B1 | * | 2/2001 | Wade, Jr. ..................... 62/604 |
| 6,240,743 | B1 | | 6/2001 | Allen, Jr. |
| 6,257,016 | B1 | * | 7/2001 | Wade, Jr. ..................... 62/604 |

* cited by examiner

Primary Examiner—William C. Doerrler
(74) Attorney, Agent, or Firm—RatnerPrestia

(57) ABSTRACT

A method and device for forming slabs of dry ice is shown. A dry ice extruding machine has been modified with a die that has a slot for extruding a slab of dry ice therethrough. The slot is blocked until a puck is formed in an end of a forming chamber of the dry ice extruding machine. The block is then removed and dry ice extruded to a desired length and then broken to give a slab of dry ice. The last step is repeated over and over as the extruded portion reaches the desired length to give the number of slabs wanted.

15 Claims, 4 Drawing Sheets

DRY ICE BLOCK EXTRUDER

BACKGROUND OF THE INVENTION

1. Field of the Invention

This invention relates generally to the manufacture of dry ice and, more particularly, to a method and apparatus for producing slabs or blocks of dry ice.

2. Background Information

Solid state carbon dioxide ($CO_2$), known as dry ice, is used in many different applications. Dry ice is ideal for preserving food because it sublimates directly from its solid phase to its gaseous phase, leaving no odor, color, taste, or residue and causes no deleterious effects to the food. In cooling and preserving food, dry ice pellets may be placed directly onto the food to rapidly cool it below some specified temperature to prevent spoilage.

Dry ice has traditionally been produced and distributed in blocks with each block weighing about 55 pounds. The blocks are cumbersome, expensive and require extra effort to crush or break apart to make the dry ice easy to use by reducing the block to reasonable size pieces. In recent years, dry ice has been produced in pellet form, which pellets are much easier to use.

A dry ice pelletizer that is made by Tomco Equipment Co. is shown in U.S. Pat. No. 4,780,119, to Brooke, where liquid $CO_2$ is injected into a chamber known as an extrusion chamber and flashed at atmospheric pressure. In this flashing process, part of the liquid $CO_2$ changes phase to a solid known as "snow," with the remaining part of the liquid $CO_2$ changing phase to gas. The gaseous $CO_2$ can exit the extrusion chamber through gas vents and the remaining snow may be compressed at the end of the extrusion chamber. The proportionate amount of the gaseous $CO_2$ versus the snow depends upon the pressure and temperature of the liquid $CO_2$ that is fed into the extrusion chamber and the surrounding pressure and temperature of the extrusion chamber. The lower the pressure and temperature, the greater the amount of snow produced in the flashing process.

When liquid $CO_2$ is flashed under ideal conditions at atmospheric pressure, approximately 48% of the liquid $CO_2$ is changed to snow, while approximately 52% of the liquid $CO_2$ is changed to gas. Because the percentage of snow formation is directly proportional to the pressure inside the extrusion chamber, when flashing occurs, it is important that the pressure inside the extrusion chamber be kept as close to atmospheric pressure as possible.

Once the snow is formed in the extrusion chamber, a piston is used to compact the snow in one end of the extrusion chamber against a die. In the traditional pelletizer, the snow will collect in the openings of the die and before long block the openings. While some small amount of snow may escape, it is not that significant. Thereafter, when the pistons move back and forth to compress the snow, the snow is compressed at the end against the die to form what is called a puck. As additional dry ice (i.e., snow) is compressed against the puck, the puck will extrude through the openings in the die.

For some applications, the use of pelletized dry ice is not the ideal situation. For example, in some occasions, blocks or slabs of dry ice are much better than pellets of dry ice. However, the 55 pound blocks of dry ice are normally much larger than desired. Sometimes it is necessary to cut the blocks of dry ice into other shapes or sizes, such as shown in U.S. Pat. No. 5,189,939, to Allen. However, when the blocks of dry ice are cut, there is attendant waste in the cutting process.

As an example of an industry that uses smaller blocks or slabs of dry ice, the airline industry uses thousands of pounds of dry ice per day to keep food cool in their serving carts. At the bottom of the serving cart is a tray located a block or slab of dry ice that is approximately 1"×5"×5". In other words, the 55 pound block would have to be cut into small slabs of dry ice that can be put in the tray in the bottom of the serving cart for the airline industry. This small slab of dry ice will then sublimate directly from the solid to gaseous state leaving no odor and no deleterious effects while keeping the food cool. The airline industry uses large amounts of dry ice per day for this particular purpose.

Slabs or blocks of dry ice could be used for many other purposes other than in the airline industry. Anytime there is a necessity to keep something cool for a period of time in which there is no residue to be dealt with during or after cooling, dry ice becomes an ideal candidate because it sublimates from solid to gaseous state, which gaseous state has no adverse effects.

If smaller blocks or slabs of dry ice can be formed directly from liquid $CO_2$, the losses attendant with cutting of large blocks of dry ice would not occur. The present invention is designed to solve this problem by providing for the extrusion of smaller blocks or slabs of dry ice that can be used in many different applications. None of the devices known by applicant allow for direct extrusion of blocks of dry ice, which blocks could be used by an end user, such as the airline industry.

SUMMARY OF THE INVENTION

A conventional dry ice pelletizer is used, which consists of a cylinder in which liquid $CO_2$ is introduced through an injection port for flashing to form gaseous $CO_2$ and solid $CO_2$ therein. The gaseous $CO_2$ is vented and a piston is used to compress any solid $CO_2$ (snow) that forms in the chamber into a single mass of dry ice at one end of the cylinder, which mass of dry ice is known as a puck. For traditional pelletizers, the openings in the die quickly fill up with snow that blocks the openings. Then the snow is compressed against the die with each stroke of the piston. Ultimately, the piston pushes against the snow and puck with sufficient pressure to force the solidified $CO_2$ out the openings in the die as a continuous rod of dry ice. Periodically, the rod of dry ice is broken off into pellets.

In the present invention, the die has been changed. In the die, there is a large slot with 1"×5" being a typical size slot. If nothing is done to block the slot, the $CO_2$, either in the gaseous state or as snow, will simply escape through the slot. To prevent that from occurring, a gate is moved over the slotted opening. The gate, once in place, prevents $CO_2$ either in the gaseous state or solid state of snow from escaping from the compression chamber. Now as a piston moves back and forth with the introduction of liquid $CO_2$, the snow begins to compress against the die. Once a puck is formed against the die, then the gate can be removed. Thereafter, as the piston continues to reciprocate inside the cylinder with the introduction of liquid $CO_2$ that flashes to a combination of gaseous $CO_2$ and snow, the snow is compressed against the puck, and the puck is extruded through the die. If the slot in the die is approximately 1"×5", the extruded dry ice will have a cross-sectional area of approximately 1"×5".

Immediately upon passing through the die, the 1"×5" slab of dry ice has not set up into a good solid form. Therefore, an additional distance known as a forming chamber will be located adjacent to the die. The forming chamber may be a part of the die or a separate item attached thereto. Typically, the forming chamber would be approximately 2 inches thick.

As the extrusion process continues and the 1"×5" slab of dry ice is extruded, at some time the slab of dry ice will reach a desired length. A sensing device, such as a photocell, would be used to indicate the desired length of the slab has been reached. Assuming the desired length is 6 inches, once the extruded 1"×5" cross-section of dry ice reaches 6 inches, the photocell will send a signal back indicating the desired length has been reached. That signal can then be used to activate a sizing cylinder that will move a sizing block that breaks off the extruded dry ice into slabs of approximately 1"×5"×6" size. The sizing block can be controlled by any type of actuation device that has sufficient strength and speed, but in the present process, a pneumatic cylinder is probably ideal. Therefore, a pneumatic sizing cylinder would move a sizing block that would break off the extruded dry ice into desired lengths.

Since liquid $CO_2$ is continuously being fed to the extrusion chamber for compression by the piston, snow continues to compress and the rectangular shaped cross-sectional area continues to be extruded. The next time the rectangular shaped extruded dry ice reaches the desired length, the process is repeated again. By repeatedly using this process, numerous blocks or slabs of dry ice of the desired dimensions are formed without the necessity for sawing or cutting.

The gate only needs to be used during startup of the extrusion process. At that time, some force needs to hold the gate against the die. That force of holding the gate against the die may be provided by any of a number of different means, including a track that would force the gate against the outside of the die. On the other hand, the sizing block does not need the force to push it against the die because all the sizing block is doing is breaking off the extruded rectangular section of dry ice.

It is an object of the present invention to provide a device for extruding blocks or slabs of dry ice.

It is another object of the present invention to provide a dry ice extruder that can automatically extrude blocks or slabs of dry ice.

It is yet another object of the present invention to modify a dry ice extruder to have a die that will extrude a rectangular shaped slab of dry ice, which slab may be broken upon reaching a predetermined length.

It is another object of the present invention to provide a die with a slot therein for extruding a rectangular cross-section of dry ice, which slot is blocked during startup of the extruder to allow for the building of a puck of dry ice therein.

It is still another object of the present invention to provide a dry ice extruder for extruding a slab of dry ice, which slab may be broken into predetermined lengths, the process being automated for blocking the slot in the die upon startup and thereafter to actuate a sizing device for breaking the extruded slab into predetermined lengths.

These and other objects of the present invention are met when practicing the method or device as described hereinbelow.

DESCRIPTION OF THE PREFERRED EMBODIMENT

Figure 1:
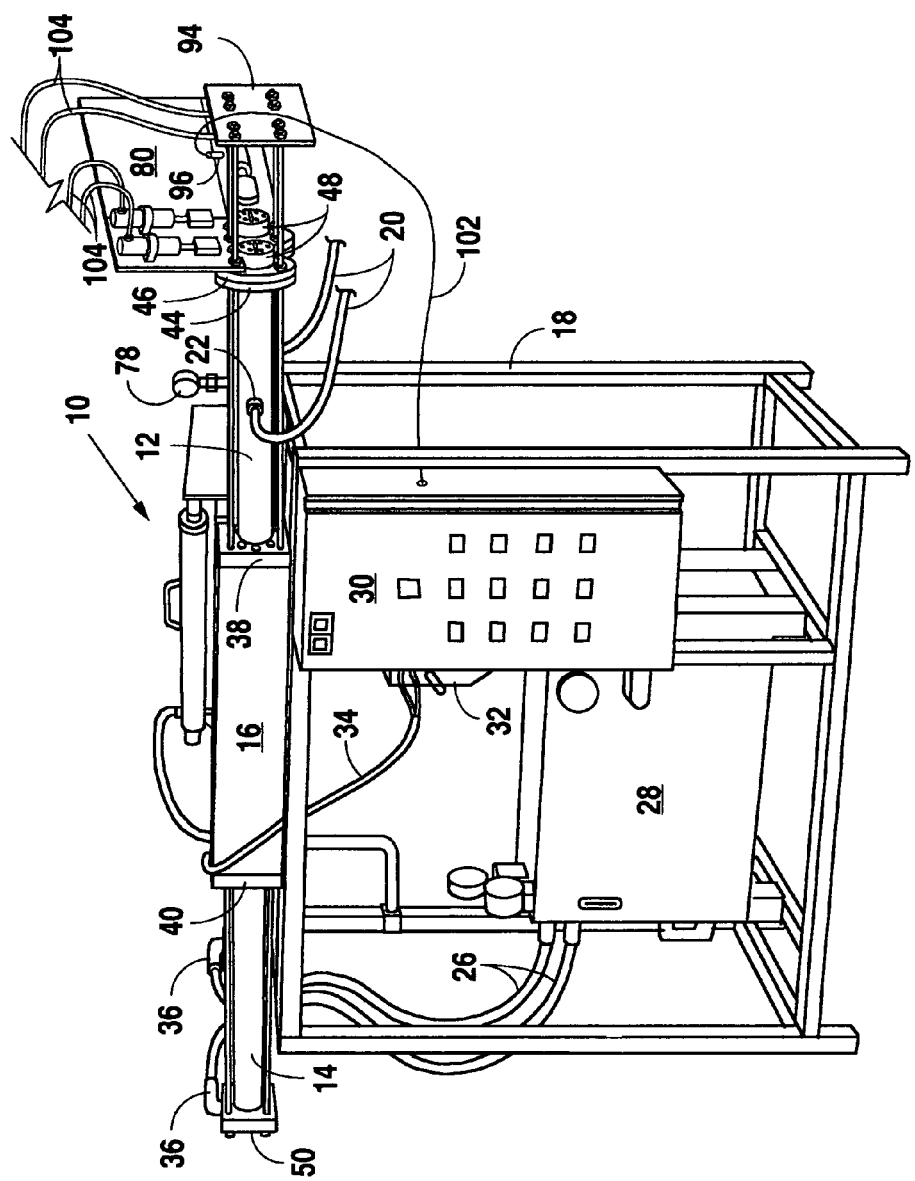
FIG. 1 is a perspective view of a Tomco type dry ice extruder which has been modified to extrude blocks or slabs of dry ice in accordance with the present invention.

FIG. 1 shows a commercially available, widely used, dry ice extruder 10 that has been modified from a pelletizer to extrude blocks or slabs of dry ice. The dry ice extruder 10 is commercially available for purchase without the modifications from companies, such as Tomco Equipment Company. Initially hereinbelow, the items commercially available through Tomco or some other supplier will be described before describing the modifications that constitute the present invention. Because dry ice extruders are widely available in the marketplace, dry ice extruder 10 will only be described generally hereinbelow.

Dry ice extruder 10 has a pair of side-by-side extrusion cylinders 12 that are operated by a pair of side-by-side hydraulic cylinders 14. The hydraulic cylinders 14 are separated from the extrusion cylinders 12 by a spreader box 16. Extrusion cylinders 12, hydraulic cylinders 14, and spreader box 16 are all mounted on frame 18, as well as other components that will be described hereinbelow.

To operate dry ice extruder 10, liquid $CO_2$ is delivered to extrusion cylinders 12 through liquid $CO_2$ feed hoses 20 from a source of liquid $CO_2$ (not shown). Feed hoses 20 feed liquid $CO_2$ into extrusion cylinders 12 through injection connectors 22. Inside of extrusion cylinders 12, the liquid $CO_2$ is flashed so a portion thereof forms gaseous $CO_2$ and the remainder forms solid $CO_2$ in what is commonly called "snow." The gaseous $CO_2$ is vented or removed from the extrusion cylinders 12 (see FIG. 2) and the snow compacted or compressed by piston 24 (see FIG. 2) as will subsequently be explained.

To operate piston 24 inside of extrusion cylinders 12, hydraulic cylinder 14 is connected via hydraulic hoses 26 through a pump (not shown) to a reservoir of hydraulic fluid 28. A control box 30 controls the operation of the dry ice extruder 10 with motor controller 32 receiving commands from connection 34 to spreader box 16 and from control box 30. Hydraulic hoses 26 are connected through fittings 36 to deliver hydraulic fluid to and from hydraulic cylinders 14.

Extrusion cylinders 12 are connected on one end of spreader box 16 through extrusion flange 38, while hydraulic cylinders 14 are connected on the opposite end of spreader box 16 by hydraulics flange 40.

The parts described in the foregoing Description of the Preferred Embodiment are old and can be found in a Tomco extruder. The portions described hereinbelow are what is new and added by the present invention.

Figure 2:
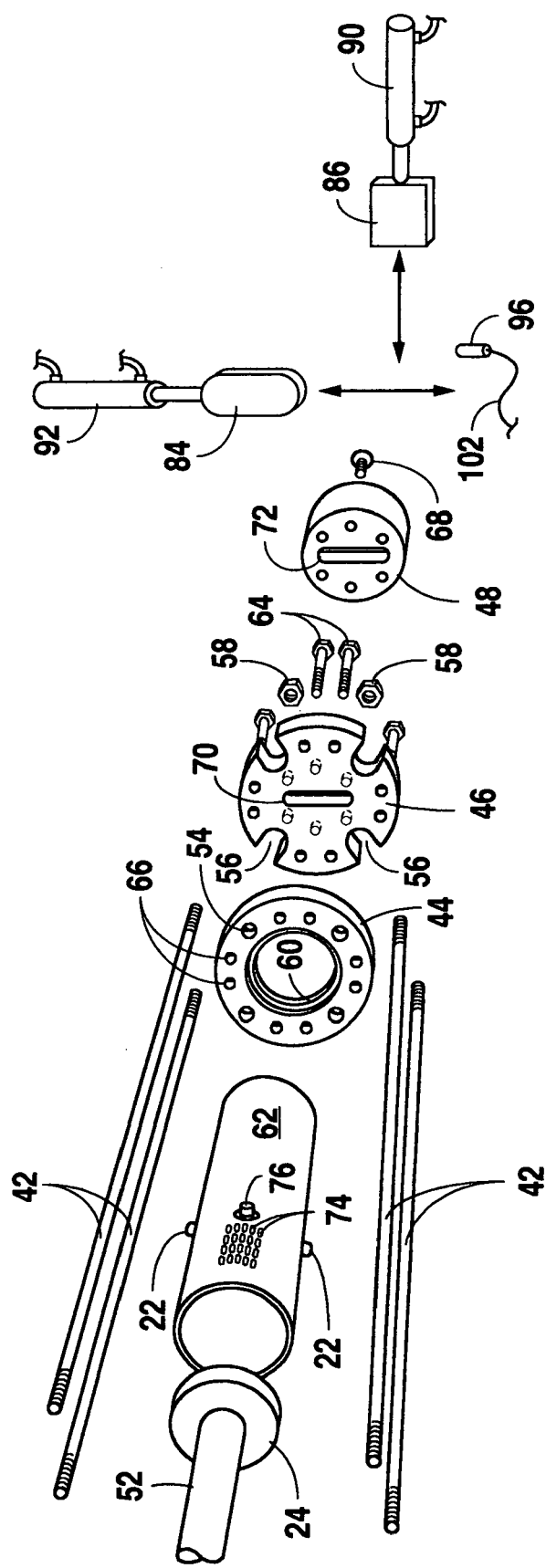
FIG. 2 is an exploded perspective view of the extrusion cylinder portion of the dry ice extruder, including the die, forming chamber, gate and sizing device.

Referring to FIG. 2 now in combination with FIG. 1, extrusion cylinders 12 are held together by four prestressed rods 42 that connect from extrusion flange 38, around extrusion cylinders 12, through die holder 44, die 46, and forming chamber 48, and extend there beyond. On one end, the prestressed rods 42 can end at the extension flange 38 of spreader box 16, or they may extend therethrough to hold together hydraulic cylinders 14 and end with hydraulic flange 50 (see FIG. 1).

While it may not be immediately clear upon viewing FIG. 1, the dry ice extruder 10 is a dual system with two extrusion cylinders 12 and two hydraulic cylinders 14 being side by side. The operation of extrusion cylinders 12 alternates with piston 24 being retracted by piston rod 52 (see FIG. 2) in the first extrusion cylinder 12 and extended in the second extrusion cylinder 12. This operation is controlled by hydraulic cylinders 14, alternately extending and retracting piston rods 52 connected to pistons 24 in the side-by-side extrusion cylinders 12. This alternating type of compression and retraction provides balance to dry ice extruder 10, so it will operate much smoother. Because extrusion cylinders 12 are identical, only one extrusion cylinder 12, along with die holder 44, die 46, forming chamber 48, and the controls associated therewith, will be explained in detail.

Prestressed rods 42 extend through holes 54 of die holder 44 and notches 56 in die 46. Nuts 58 thread onto the prestressed rods 42 to clamp the inner lip 60 of the die holder 44 around cylinder 62 of extrusion cylinders 12. Forming chamber 48 can be made either integral with die 46 or may be bolted thereto by recessed bolt 68. Die 46 is also held to die holder 44 by bolts 64 connecting into holes 66. In the center of die 46 is an extruding slot 70, through which dry ice may be extruded. The dry ice feeding through extruding slot 70 has not yet formed, so forming slot 72 in forming chamber 48 will give the dry ice sufficient time to form and harden prior to being exposed to atmosphere.

In typical operation, liquid $CO_2$ from a suitable source would be injected into cylinder 62 of extrusion cylinder 12 through feed hoses 20 and injection connectors 22. Inside of cylinder 62, the liquid $CO_2$ will be flashed to atmospheric pressure thereby forming gaseous $CO_2$ and solid $CO_2$ in the form of snow. The gaseous $CO_2$ will be vented to either atmosphere or a gaseous $CO_2$ collection system through vent holes 74. Pressure port 76 on cylinder 62 is used to monitor the pressure inside of cylinder 62 through either a pressure gauge 78 (see FIG. 1) or by appropriate feedback to control box 30. Depending upon the pressure inside of cylinder 62, the amount of liquid $CO_2$ being injected or the repetition rate of piston 24 can be varied.

Figure 3:
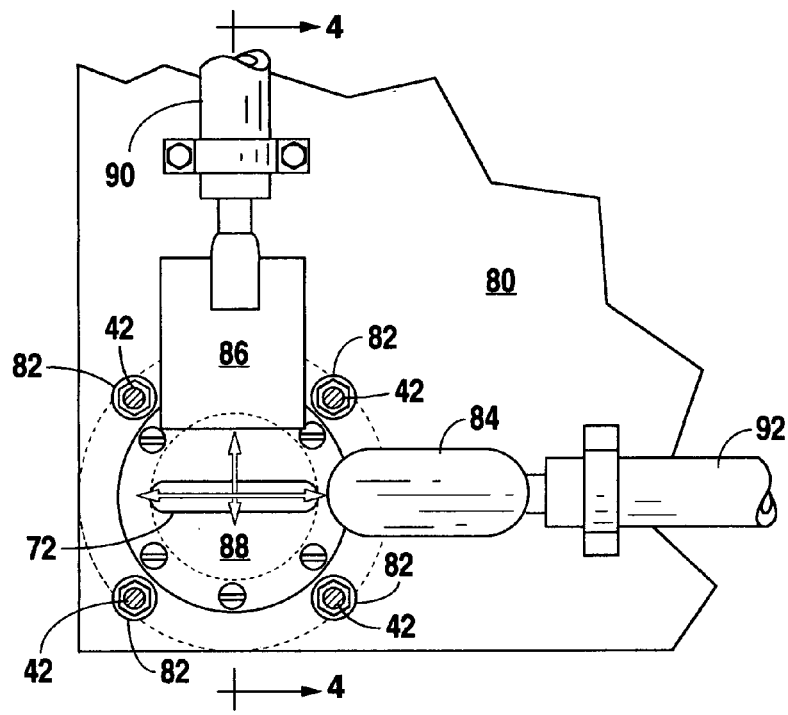
FIG. 3 is an elevated end view of the die on the dry ice extruder.
Figure 4:
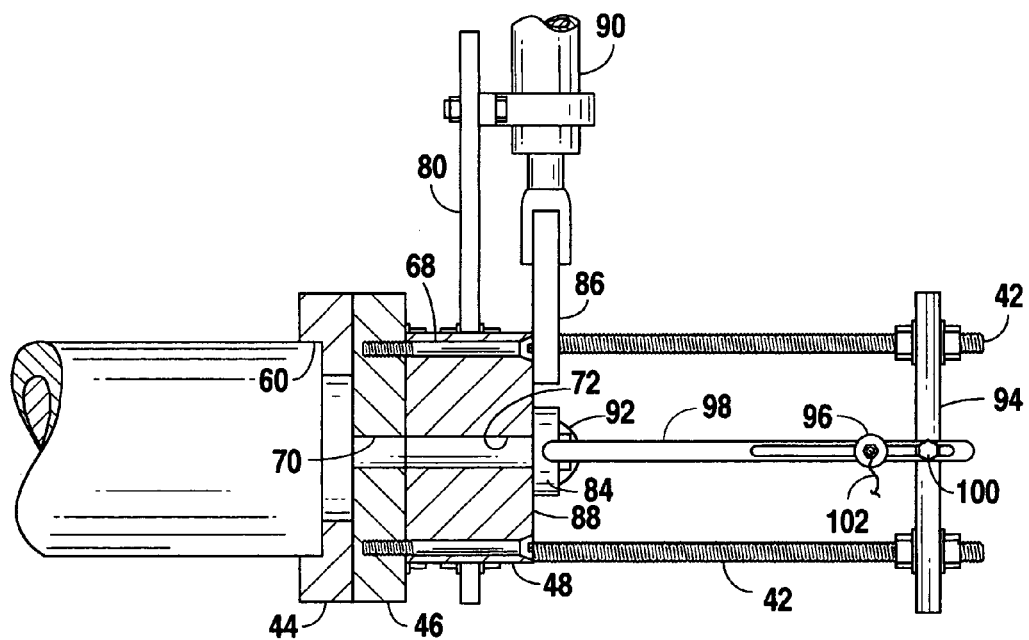
FIG. 4 is an elevated partial cross-sectional view of FIG. 3 showing the extrusion cylinder on the dry ice extruder showing the die, forming chamber, gate and sizing device.

To prevent the gaseous $CO_2$ and the solid $CO_2$ (snow) from escaping through extruding slot 70 and forming slot 72 to atmosphere, something must block slots 70 or 72. In the present invention, a mounting plate 80 is bolted onto prestressed rods 42 by nuts 82. (See FIGS. 3 and 4 in combination with FIGS. 1 and 2.) Mounting plate 80 is located along the prestressed rods 42 so that gate 84 and sizing block 86 are flush with an outer surface 88 of the forming chamber 48. Mounted on the mounting plate 80 is a sizing cylinder 90 for operating the sizing block 86. Also mounted on mounting plate 80 is a gate cylinder 92 for operating gate 84.

On the ends of prestressed rods 42 is located an end plate 94 on which a photocell 96 is located. The photocell 96 may be adjusted inward or outward by adjusting slotted rod 98 and screw 100.

In actual operation, when someone starts the dry ice extruder 10, liquid $CO_2$ comes in through feeder hoses 20 from a source of liquid $CO_2$ (not shown) into cylinder 62 of extrusion cylinders 12. The liquid $CO_2$ is flashed to gaseous $CO_2$ and to solid $CO_2$ (snow) inside of cylinder 62. The gaseous $CO_2$ is removed through vent holes 74. At this time, the forming slot 72 of the forming chamber 48 should be blocked by gate 84. Gate 84 may either be a manual operation of physically bolting a plate over forming slot 72 or may be an automatic gate 84 that is moved into place by gate cylinder 92. Gate 84 should be pressed tightly against the outer surface 88 of the forming chamber 48 by any convenient means, such as tracks (not shown), that press gate 84 tightly over forming slot 72.

As liquid $CO_2$ is continually flashed inside cylinder 62 while piston 24 is operating therein via hydraulic cylinders 14, the extrusion cylinder 12 will be cooled down. With the cooling of extrusion cylinder 12, snow will begin to accumulate therein and be pushed against die 46 at the end of cylinder 62. Further accumulation of snow (solidified $CO_2$) will further consolidate to form a puck at the die end of cylinder 62. The puck once sufficiently solidified and formed, it is now time for extruding cylinder 12 to start extruding dry ice. Therefore, gate cylinder 92 retracts gate 84 to allow solid dry ice to be pushed through extruding slot 70 of die 46 and formed or hardened in forming slot 72 of forming chamber 48. Thereafter, solidified dry ice in slab form is extruded out through extruding slot 70 and forming slot 72. Extruding slot 70 has the normal amount of taper as is normally used for extruding dry ice. Typically there is an approximately 1° taper in both extruding slot 70 and forming slot 72.

As the slab of dry ice continues to be extruded through extruding slot 70 and formed in forming slot 72, at some point the slab of extruded dry ice will reach a desired length. In the present invention, photocell 96, which is mounted on end plate 94, may be adjusted to determine that length. Assume photocell 96 is set to give a signal to control box 30 via connection 102 when the slab of extruded dry ice reaches a predetermined length. The signal being fed back to control box 30 via connection 102 from photocell 96 will actuate the sizing cylinder 90 that moves sizing block 86 against the dry ice to break off the slab of dry ice that has been extruded. Assuming photocell 96 is set for 6 inches, the extruded slab of dry ice will be approximately 6 inches long.

While different types of actuating devices may be used to move gate 84 or sizing block 86, in the preferred embodiment the sizing cylinder 90 and gate cylinder 92 are pneumatically operated. The pneumatic pressure may be provided by pneumatic pressure in the facility or can be from gaseous $CO_2$ that has been formed. Even a hydraulic cylinder can be used for gate cylinder 92, but typically a hydraulic cylinder would be too slow for the sizing cylinder 90. Sizing cylinder 90 must be fairly rapid in operation to break off the extruded slab of dry ice while the extrusion process continues. Electrical solenoids can be used in place of sizing cylinder 90 and gate cylinder 92. Assuming pneumatic pressure is used in sizing cylinder 90 and gate cylinder 92, the supply lines 104 (see FIG. 1) are connected to a suitable source of pneumatic pressure (not shown).

Figure 5:
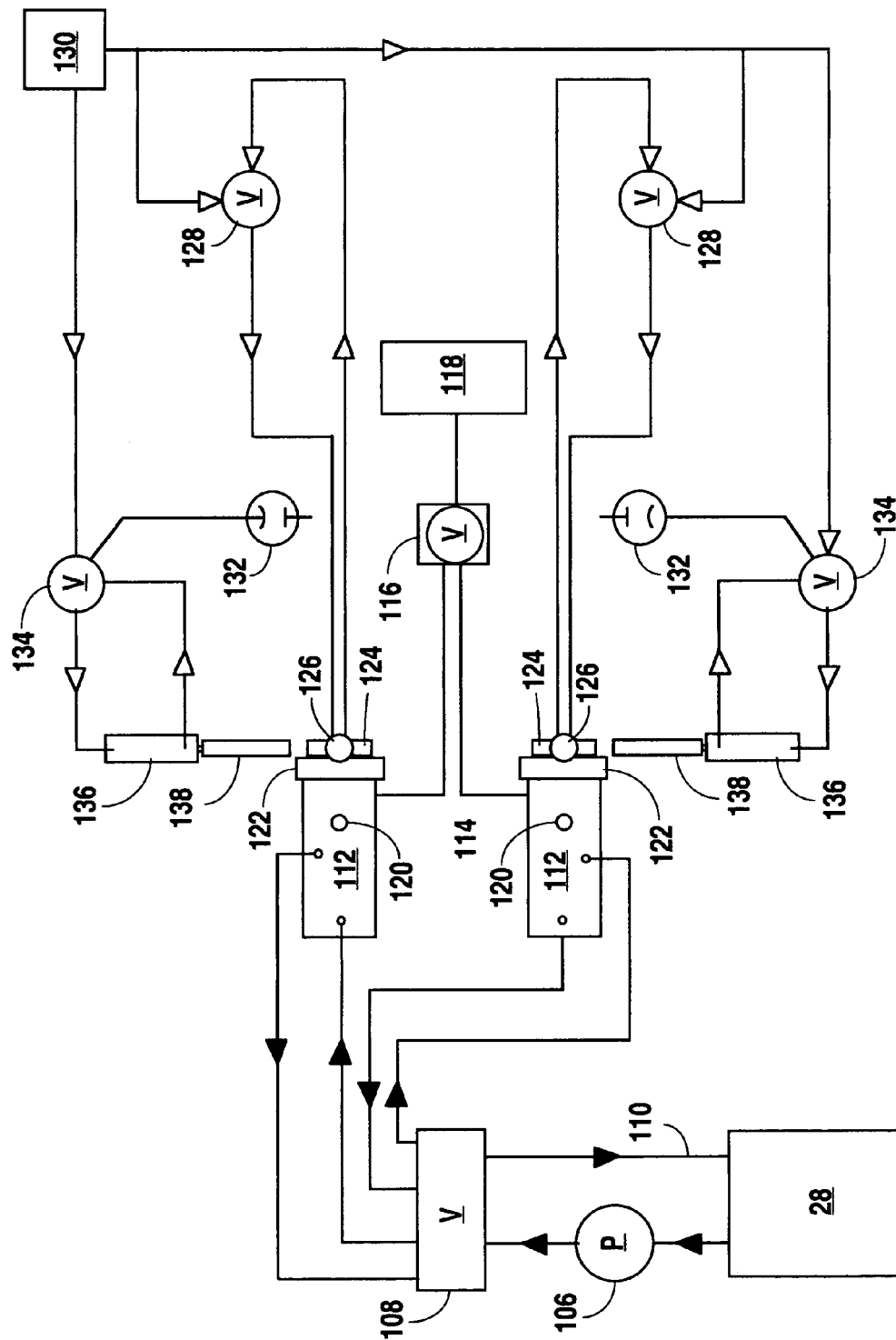
FIG. 5 is a simplified schematic diagram indicating hydraulic, pneumatic and liquid $CO_2$ supply systems for the dry ice extruder.

Referring now to FIG. 5, a schematic illustration as to the operation of the dry ice extruder 10 is illustrated in a schematic diagram. Where appropriate, like numbers will be utilized the same as numbers previously used hereinabove.

Hydraulic fluid 28 is pumped by pump 106 through control valve 108 to extrusion cylinders 112 in an alternating manner. In other words, as piston 24 (not shown in FIG. 5) is compressing in one extrusion cylinder 112, the piston 24 is retracting in the other extrusion cylinder 112. Control valve 108 acts as a double-pole, double-throw electrical switch except control valve 108 is controlling the direction of fluid flow rather than current. From control valve 108, fluid is returned through return line 110 to the reservoir for hydraulic fluid 28.

On the other end of extrusion cylinder 112, the liquid $CO_2$ is introduced through $CO_2$ lines 114 via control valve 116 from liquid $CO_2$ reservoir 118. Inside of extrusion cylinder 112, the liquid $CO_2$ is flashed to form gaseous $CO_2$ and solid $CO_2$ (snow). The gaseous $CO_2$ is vented through vents 120, either to atmosphere or to a gaseous $CO_2$ collection system.

On the end of the extrusion cylinder 112 is mounted a die 122, followed by forming chamber 124. Initially, when starting the operation, gate actuator 126 moves a gate (not shown) to block the extruding slot (not shown) through die 122 and forming chamber 124. In this illustrative embodiment, gate actuator 126 is a pneumatic cylinder operated by gate valve 128, which receives pressurized air from pressurized air source 130. After the extrusion cylinder 112 has operated for a sufficient length of time to form a puck at the die end thereof, gate valve 128 operates gate actuator 126 to move the gate (not shown) from blocking the extrusion slot (not shown in FIG. 5, but previously explained in connection with FIGS. 1–4). Thereafter, dry ice is extruded in slab form through die 122 and forming chamber 124. However, once the dry ice reaches a predetermined length, the extruded slab of dry ice will be sensed by photocell 132, which will send a signal to sizing valve 134. Sizing valve 134, which receives pneumatic pressure from pressurized air source 130, will deliver pressurized air to sizing cylinder 136. Sizing cylinder 136 will actuate sizing block 138, which will be pressed against the extruded slab of dry ice causing the slab to break off at the face of forming chamber 124. The actuation of sizing cylinder 136, causing the movement of sizing block 138, is fairly rapid because the extrusion process continues without interruption. In other words, sizing block 138 is moved downward to break the extruded slab of dry ice and retracted in a fairly rapid manner. The extrusion process continues uninterrupted until again photocell 132 senses the end of the extruded slab of dry ice to again operate the control valve 134 to actuate the sizing cylinder 136 and move sizing block 138.

In this manner, continual slabs of dry ice are extruded that will have a predetermined thickness, width and length. The length is controlled by adjustment of photocell 132, with the width and thickness determined by the size of the slot in die 122 and forming chamber 124.

While in the preferred embodiment it is envisioned the extruded slabs of dry ice would be approximately 1"×5"×5", different dimensions can be extruded with the equipment currently available on the market today. It is envisioned that current equipment could extrude slabs of dry ice as thick as 2 inches and as wide as 5 inches without significant modification. The length can be any length desired, but a 5 inch length is what is typically used in the airline industry. Depending upon how the slab or block of dry ice is to be used, the length of the slab or block can be changed very quickly. If other dimensions are desired to be changed, simply by changing the die, the other dimensions can also be changed.

Initially, the gate that blocks the extruding slot, because it only needs to be used once at the beginning of the extrusion process, could be set up by any of a number of different means, including even the bolting of a blank plate on the end of the forming chamber and removing the blank plate once the puck has been formed.

What is claimed is:

1. A method of extruding individual polyhedron shaped slabs of dry ice from a source of liquid $CO_2$, said method comprising the steps of:
   blocking a substantially rectangular shaped extruding slot in a die at an end of a cylinder of a dry ice extruding machine;
   injecting said liquid $CO_2$, from said source into said cylinder of said dry ice extruding machine to form gaseous $CO_2$ (snow) and solid $CO_2$ therein;
   degassing said cylinder to remove gaseous $CO_2$ through vents from said cylinder while forming said snow in said cylinder;
   building a puck in said end of said cylinder having said extruding slot in said die by moving a pressure piston back and forth in said cylinder of said dry ice extruding machine during said injecting;
   unblocking said extruding slot to allow dry ice to be extruded therethrough in the form of a continuous polyhedron shaped slab disposed outside of said cylinder;
   breaking, outside of said cylinder, said extruded continuous slab of dry ice upon the length thereof reaching a predetermined distance to provide an individual slab of dry ice; and
   repeating said breaking step to create as many of said individual slabs of dry ice as desired,
   wherein at the outer end of said extruding slot a forming chamber with a substantially rectangular shaped forming slot therein for receiving said slab of extruded dry ice therethrough, said forming slot allowing said slab of extruded dry ice to set before said breaking step, and
   wherein a sizing mechanism moving a sizing block adjacent and outside of said cylinder and said forming chamber for said breaking of said extruded dry ice in said predetermined length.

2. The method of extruding a slab of dry ice from a source of liquid $CO_2$ as recited in claim 1, wherein said sizing mechanism is pneumatically operated and said pressure piston is hydraulically operated.

3. The method of claim 1 including tapering the extruding slot.

4. The method of extruding a slab of dry ice from a source of liquid $CO_2$ as recited in claim 3, including a removable gate for said blocking and said unblocking of said extruding slot.

5. The method of extruding a slab of dry ice form a source of liquid $CO_2$ as recited in claim 4, wherein said removable gate is activated by a gate cylinder.

6. The method of extruding a slab of dry ice from a source of liquid $CO_2$ as recited in claim 5, wherein said removable gate is pressed against said extruding slot until a puck is formed in said cylinder.

7. The method of claim 3 including tapering the extruding slot with an approximately 1° taper.

8. A dry ice extruding machine for extruding polyhedron shaped slabs of dry ice from a source of liquid $CO_2$, a source of power connecting to said dry ice extruding machine, said dry ice extruding machine comprising:
   a frame;
   at least one extrusion cylinder mounted on said frame;
   a piston in said extrusion cylinder;
   connection of power from said source of power to said piston to cause back and forth movement of said piston in said extrusion cylinder;
   injection ports on said extrusion cylinder for injecting said liquid $CO_2$ into said extrusion cylinder and flashing said liquid $CO_2$ into gaseous and solid $CO_2$;
   vents on said extrusion cylinder for venting said gaseous $CO_2$ from said extrusion cylinder;
   a substantially rectangular shaped die mounted on a first end of said extrusion cylinder, said die having a slot therein for extruding a continuous polyhedron shaped slab of said solid $CO_2$ therethrough;
   a blocking device for blocking said slot until a puck has formed in said first end of said extrusion of cylinder and thereafter removing said blocking device; and a sizing mechanism for moving a sizing block, disposed outside of said extrusion cylinder, for breaking said extruded continuous slab upon the length thereof reaching a predetermined distance.

9. The dry ice extruding machine of claim 8 in which said substantially rectangular shaped die is tapered.

10. The dry ice extruding machine of claim 9 in which said tapered die includes an approximately 1° taper.

11. The dry ice extruding machine for extruding slabs of dry ice from a source of liquid $CO_2$ as recited in claim 9 wherein said connection of power is a hydraulic cylinder driving said piston through a second end of said extrusion cylinder.

12. The dry ice extruding machine for extruding slabs of dry ice from a source of liquid $CO_2$ as recited in claim 11 wherein said dry ice extruding machine includes a sensor for determining if said slab has reached a predetermined length and generating a sizing control signal, said sizing control signal activating a sizing mechanism to break said slab into said predetermined length.

13. The dry ice extruding machine for extruding slabs of dry ice from a source of liquid $CO_2$ as recited in claim 12 wherein said die further includes a forming chamber with a rectangular shaped forming slot therein so that said slab can set before being broken into said predetermined length.

14. The dry ice extruding machine for extruding slabs of dry ice from a source of liquid $CO_2$ as recited in claim 13 wherein said sizing mechanism is a block that moves adjacent and parallel to an outer face of said forming chamber to break said slab into said predetermined length, said block being pneumatically operated.

15. The dry ice extruding machine for extruding slabs of dry ice from a source of liquid $CO_2$ as recited in claim 9 wherein said block device is pressed on outer opening of said slot to prevent escape of $CO_2$ therethrough while forming said puck.

* * * * *